Nov. 1, 1960     D. McINTYRE ET AL     2,958,219
ADAPTER FOR PORTABLE GAGE TESTER
Filed March 26, 1959     2 Sheets-Sheet 2

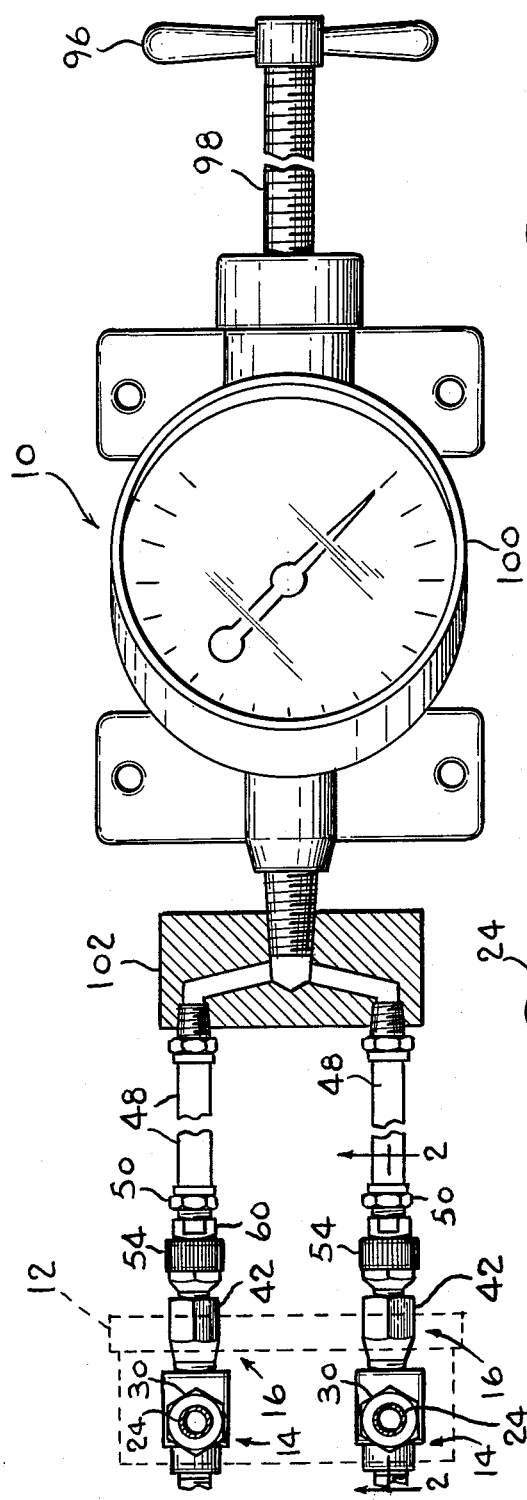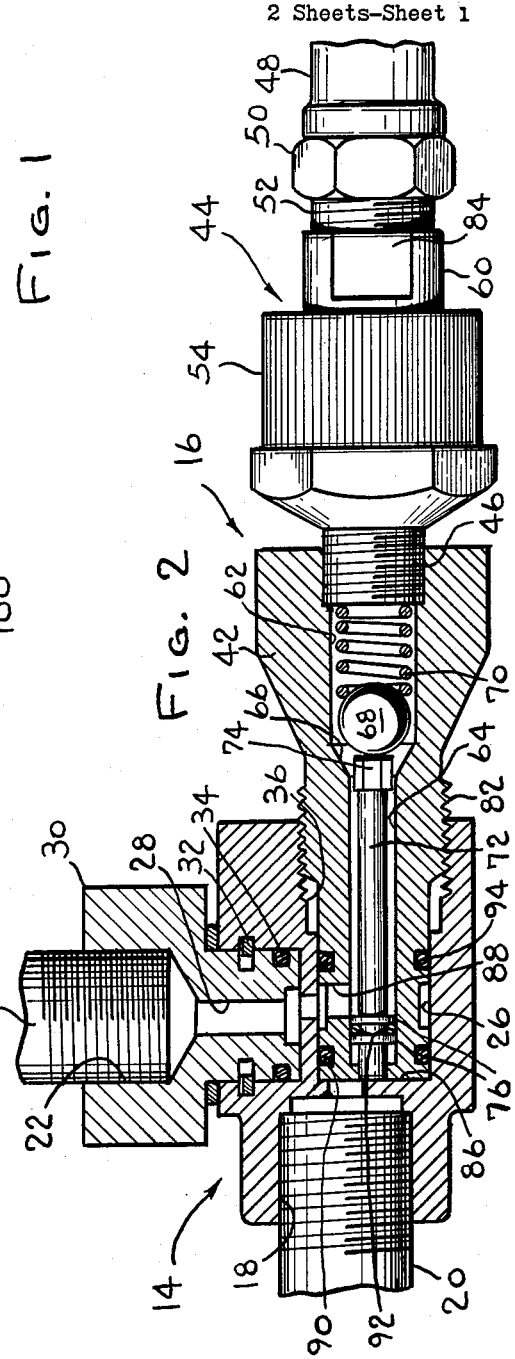

INVENTORS
DANIEL McINTYRE
JAMES I. MORGAN
By John W. Michael
ATTORNEY

United States Patent Office 2,958,219
Patented Nov. 1, 1960

2,958,219

ADAPTER FOR PORTABLE GAGE TESTER

Daniel McIntyre, Affton, Mo., and James I. Morgan, Milwaukee, Wis., assignors to The Prime Manufacturing Company, Milwaukee, Wis., a corporation of Wisconsin Filed Mar. 26, 1959, Ser. No. 802,133

2 Claims. (Cl. 73—4)

This invention relates to adapter apparatus for a portable pressure gage tester which permits testing a gage with a portable testing device without removing the gage to be tested from the installation in which it operates.

This is accomplished by a gage fitting and a test fitting which cooperate to produce the desired results. The gage fitting is connected to the gage to be tested and is installed as a permanent part of the system in which the gage operates. The gage fitting is provided with a test inlet which is plugged during normal operation. When it is desired to check the gage the test inlet in the gage fitting is opened and a conventional gage testing device is connected to the pressure gage by means of novel test fitting adapted for connection to the test inlet of the gage fitting.

The test fitting (except when removed for maintenance) remains connected to the test device and has a normally closed valve means which prevents fluid flow from the test device when such device is not in use. When, however, the test fitting is connected to the test inlet of the gage fitting the normally closed valve means is automatically opened to allow fluid flow from the test device through the test and gage fittings to the pressure gage to be tested. A second valve means including a valve seat in the gage fitting and a valve member on the test fitting prevents fluid flow from the test device into the system when the connection between the test and gage fittings is made. Thus, the pressure gage can be quickly and accurately tested without removing it from the installation in which it operates. The fittings employed to accomplish this are simple, long wearing, and relatively inexpensive to manufacture.

Other objects and advantages will be pointed out in, or be apparent from the specification and claims, as will obvious modifications of the two embodiments shown in the drawings, in which:

Fig. 1 is a top plan view showing a conventional test device connected to a pressure gage by the adapter apparatus which forms the subject matter of this invention;

Fig. 2 is a vertical sectional view taken along line 2—2 of Fig. 1;

Figure 3:
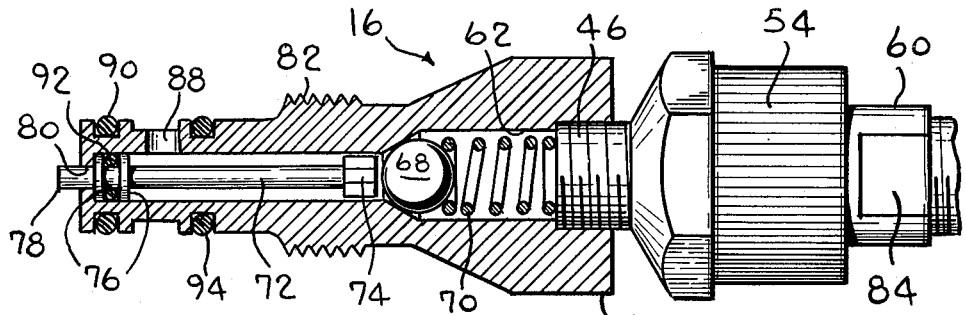
Fig. 3 is a vertical sectional view of the test fitting as it appears when not connected to the gage fitting.

Referring to the drawings, Fig. 1 shows a portable gage testing device 10 of conventional design connected to a pressure gage 12 (shown in dotted lines) by means of the adapter apparatus which, in combination with test device 10 and gage 12, forms the subject matter of this invention.

Most of the pressure gages on locomotives (for which this invention is particularly well adapted) are duplex gages having two separate gages built into one housing. For this reason the test device 10 disclosed herein (Fig. 1) has two connector lines so that both elements of the duplex gage 12 can be tested simultaneously. It should be understood, however, that the adapter apparatus of this invention can be used with a test device having one or more than two connections in the same way as it is used with the two-connection test device 12 shown in the drawings.

The adapter apparatus for testing gage 12 without removing it from the equipment on which it is installed includes a gage fitting 14 permanently connected to gage 12 which cooperates with a test fitting 16 connected to test device 10 to produce the desired results. The gage and test fittings used for each of the two connections to the duplex gage are identical. Consequently the construction and operation of only one set of fittings is described hereinafter.

Figure 4:
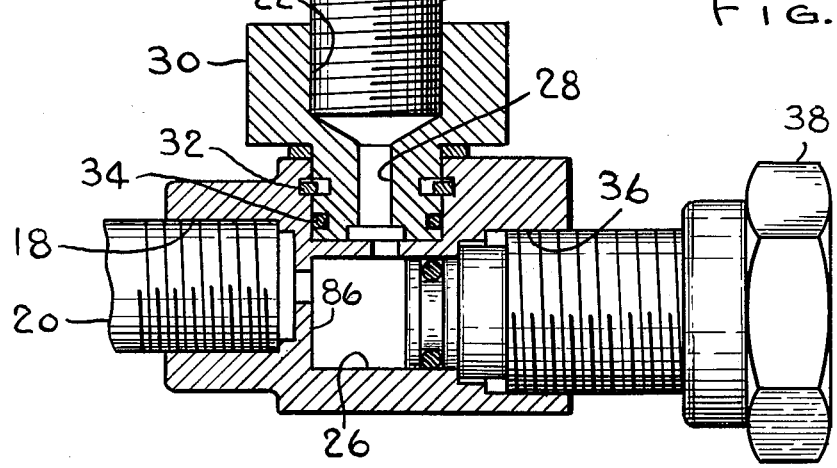
Fig. 4 is a vertical sectional view similar to Fig. 2 but with the test fitting removed and a plug installed for normal operation.

Gage fitting 14 has an operating inlet 18 to which a fluid pressure line 20 is connected and an outlet 22 to which gage 12 is connected by a threaded stem 24. As shown in Fig. 4, during regular operation fluid pressure line 20 communicates with gage stem 24 through chamber 26 and passageway 28 in gage fitting 14 to indicate the pressure in the system. To facilitate installation of gage fitting 14 into the system, such fitting can be made with a swivel connector 30 at the outlet rotatably attached to the body of fitting 14 by a retaining ring 32 and sealed thereto by an O-ring seal 34. A test inlet 36 in gage fitting 14 (the purpose of which will be described hereinafter) is closed during normal operation of the equipment by a plug 38 (Fig. 4).

Figure 5:
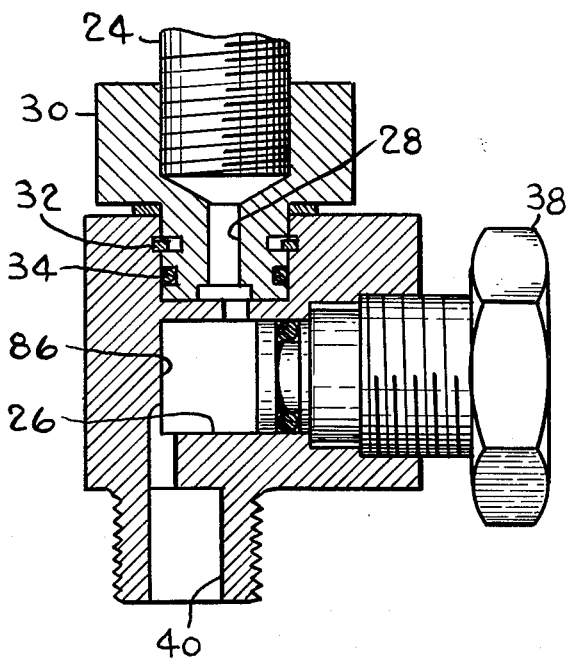
Fig. 5 is a vertical sectional view similar to Fig. 4 but showing a modified gage fitting.

Various modifications of gage fitting 14 are used in practicing my invention depending on the nature of the particular pressure gage installation in which the adapter apparatus is to be employed. Such modifications generally relate to the size and location of the operating inlet and outlet to adapt the fitting to different installations. One such modified gage fitting is shown in Fig. 5 wherein the operating inlet 40 is externally threaded and located in the bottom of the fitting instead of being internally threaded on a side as shown in Figs. 2 and 4.

When it is desired to test gage 12, fluid pressure in line 20 is released, plug 38 is removed and test fitting 16 is screwed into test inlet 36 as shown in Fig. 2. Test fitting 16 includes a body 42 and a swivel-type connector 44 having a nose portion 46 threaded into the end of the body. The test fitting is connected to a connector line 48 of test device 10 by means of a rotatable collar 50 at the end of line 48 which is threaded onto a nipple 52 in the end of swivel connector 44 as shown. A test fitting 16 is, under normal circumstances, permanently installed at the end of each connector line 48 of the test device and is removed only for replacement or repair.

Swivel connector 44 includes a section 54 and a section 60 which rotates with respect to section 54 to facilitate the connection of the test fitting to the gage fitting as will presently be described.

The nose portion 46 on section 54 of swivel connector 44 opens into a cavity 62 in the end of body 42 of the test fitting. Cavity 62 tapers to an axially aligned cavity 64 of reduced diameter forming a valve seat 66 therebetween against which a ball valve 68 is urged by a spring 70 compressed between ball 68 and nose portion 46 as shown in Fig. 3. A valve actuating plunger 72 having a head 74 abutting ball valve 68 at one end and a pair of spaced ring portions 76 at the other end is slidably mounted in cavity 64.

With test fitting 16 disconnected from gage fitting 14 as shown in Fig. 3, spring 70 will urge ball valve 68 against seat 66 which, in turn, will slide plunger 72 to the left causing the small end 78 of the plunger to protrude from an opening 80 at the end of cavity 64. Thus, when the test fitting is disconnected as shown in Fig. 3, ball valve 68 will seat against seat 66 to prevent the escape of any test fluid from test device 10.

To install test fitting 16 in gage fitting 14, body 42 is inserted into chamber 26 and threaded therein by means of externally threaded portion 82 on such body. Such installation can be quickly and easily accomplished by rotating section 54 of swivel connector 44 while holding section 60 of the connector with a wrench. Flat portions 84 are provided on section 60 for this purpose.

As test fitting 16 is threaded into the gage fitting, the protruding end 78 of plunger 72 will contact a wall 86 of chamber 26 forcing plunger 72 to the right to thereby move ball valve 68 of seat 66 from the position shown in Fig. 3 to that shown in Fig. 2. Thus, communication is established between test line 48 of the test device and the gage through swivel connector 44, cavities 62 and 64, and transverse passageway 88 in body 42 and then to the gage through passageway 28 in the gage fitting.

As the normally closed ball valve 68 in the test fitting is opened by installation of such fitting, the operating inlet 18 of the gage fitting is blocked off by the end portion of test fitting body 42 which cooperates with gage fitting chamber 26 to prevent flow of test fluid into fluid pressure line 20. Fluid flow to line 20 is blocked by an O-ring seal 90 fitted in a groove in the test fitting body which serves as a valve member seating against a wall of chamber 26 which serves as a valve seat. An O-ring seal 92 mounted between rings 76 on plunger 72 prevents fluid flow out opening 80 at the end of cavity 64 and a second O-ring seal 94 fitted in a groove in the test fitting body prevents fluid flow out past the threaded joint between the test fitting and the test inlet of the gage fitting.

After test fitting 16 has been installed as shown in Figs. 1 and 2, gage 12 is tested by actuating a piston (not shown) in test device 10 by means of a handle 96 on a threaded stem 98 which causes test fluid (usually oil) to be forced under pressure up into a master gage 100 of the test device and also into gage 12 through a branch fitting 102, test fluid lines 48 and test fittings 16 to thereby exert the same pressure on both gages. The pointer (or pointers) of the gage being tested is then adjusted if necessary to coincide with the reading on the master gage. The pressure is then relieved by withdrawing the pressure piston of the test device causing the test fluid in gage 12 to flow back into the test device. The operation is completed by removing test fitting 16 from test inlet 36 of gage fitting 14 and re-installing plug 38 therein. The system can then be returned to service.

Although two embodiments of the present invention have been illustrated and described, it will be apparent to those skilled in the art that various changes and modifications may be made therein without departing from the spirit of the invention or from the scope of the appended claims.

We claim:

1. The combination with a pressure gage and a gage testing device of: a gage fitting having an operating inlet adapted for connection to a fluid pressure line, a test inlet adapted for connection to said testing device, and an outlet adapted for connection to a pressure gage and communicating with said operating and test inlets; a test fitting connected to a testing device and adapted for connection to said test inlet of said gage fitting; a valve seat formed in said gage fitting between said operating inlet and said outlet; a valve member on said test fitting adapted to seat on said valve seat when said test fitting is connected to said test inlet to thereby prevent fluid flow from said operating inlet to said outlet; normally closed valve means mounted in said test fitting to normally prevent fluid flow through said test fitting; and a valve actuating member movably mounted in said test fitting, said valve actuating member adapted for automatic actuation to open said valve means by connecting said test fitting to said test inlet.

2. The combination according to claim 1 in which said valve means includes a valve seat in said test fitting, a valve member movably mounted in said test fitting, and a spring urging said valve member toward said valve seat to normally shut off flow through said test fitting.

References Cited in the file of this patent

UNITED STATES PATENTS

| | | |
|---|---|---|
| 719,968 | Wood | Feb. 3, 1903 |
| 1,200,432 | Swan | Oct. 3, 1916 |
| 2,177,278 | Hill | Oct. 24, 1939 |